Figure 1:
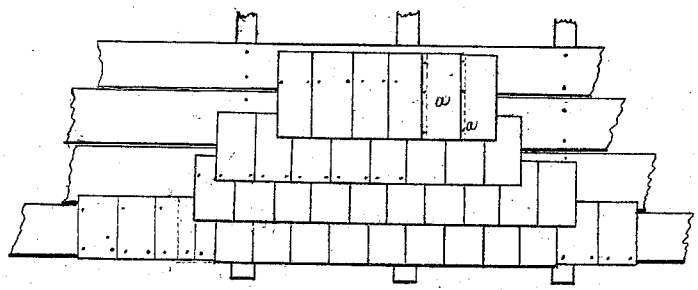

CHARLES W. CHAFFEE'S
Improved Roofing.

117601.  PATENTED AUG 1 1871

Witnesses
P. F. Bartle
Seward Smith

Charles W. Chaffee
Inventor.
Thomas G. Orwig,
Attorney

//117,601

UNITED STATES PATENT OFFICE.

CHARLES W. CHAFFEE, OF DES MOINES, IOWA.

IMPROVEMENT IN FIRE AND WATER-PROOF ROOFINGS.

Specification forming part of Letters Patent No. 117,601, dated August 1, 1871.

*To all whom it may concern:*

Be it known that I, CHARLES W. CHAFFEE, of Des Moines, in the county of Polk and State of Iowa, have invented certain Improvements in Roofing, of which the following is a specification:

My invention is a light, elastic, durable, and cheap fire and water-proof roofing; and consists: First, in a liquid composition, as hereinafter described. Second, in a flexible artificial shingle or slate, as hereinafter set forth.

I prepare my composition in the following manner: I take from three (3) to five (5) pounds of hot liquid resin, a half gallon of animal oil, and two (2) gallons of glycerine, and mix and unite the same in a liquid state. This combined liquid, resin, oil, and glycerine I then mix with one (1) barrel (forty-two gallons) of hot liquid coal-tar. I next add about four hundred (400) pounds of finely-pulverized soap-stone. This large quantity of soap-stone gives consistency to the liquid composition, and the whole mass becomes an adhesive liquid plaster or cement, that is easily applied with a brush to any wooden, metal, felt, or paper roofing or wall. It will dry and harden rapidly. The large proportion of soap-stone used absorbs all the volatile liquid, and the odor of the coal-tar is almost entirely destroyed thereby. The soap-stone really forms the basis of my composition, and after being applied and dry it will resemble a soap-stone surface, and also possess the soap-stone fire-proof qualities. The coal-tar and other adhesive liquids and component parts named I use as a means to reunite the particles of soap-stone, and to give elasticity to my composition when it becomes a solid.

My roofing composition may be advantageously used wherever it is desired to shut out water and moisture, and to protect perishable building material from fire and water and decay. Brick, stone, wood, and other porous substances may be immersed and saturated with my composition before being placed in walls and buildings. By adding sufficient sand to my roofing composition it will make excellent paving.

I am aware that the materials named have been used for roofing in other combinations and proportions; but I claim that my combination, having soap-stone for its basis, is new and superior.

My drawing represents the second part of my invention. I cut felting or paper-board into pieces of uniform size and of various shapes, and immerse them in my roofing composition, and then lay them on pulverized soap-stone to dry, turning them as often as required in order that the particles of soap-stone will adhere on every side of each piece. When perfectly dry I count and bundle them in the manner that wooden shingles are bundled and prepared for market.

Figure 2:
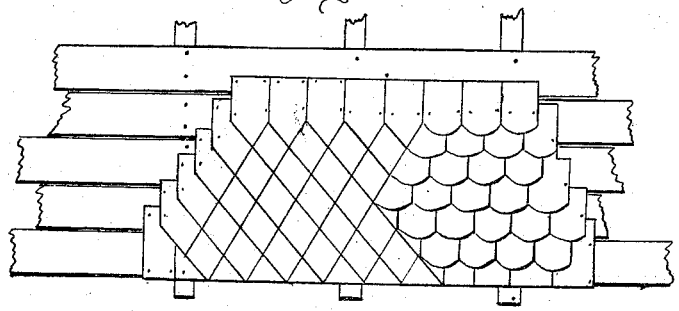

Figure 1 is a section of a roof representing my artificial shingles, of quadrilateral form, nailed on the sheathing. The pieces can be lapped in the usual manner, or as represented by those marked *a a*. The nails may be covered or not, as desired. Fig. 2 represents my shingles with diamond ends and round ends, to show that they can be made to form roofings of ornamental designs.

I am aware that my artificial shingles and slate are of common form, and placed upon the roof in a common way. I am also aware that felting and paper in sheets are used for roofing. I claim, however, that my mode of cutting felting and paper into small pieces of uniform size and coating the same, as described, is new and greatly advantageous.

On account of the adhesive and flexible nature of my artificial shingle or slate the pieces will join and pack closer on a roof than wood or slate, and consequently form a more compact roof, that will be impervious to both air and water.

I claim as my invention—

1. The roofing composition, prepared in the manner described, and of the materials and proportions specified.

2. As a new article of manufacture and commerce, the flexible artificial shingle or slate, as set forth.

CHARLES W. CHAFFEE.

Witnesses:
P. F. BARTLE,
SEWARD SMITH.